(No Model.) 5 Sheets—Sheet 5.
C. M. CLINTON & J. McNAMARA.
TYPE WRITING MACHINE.
No. 474,333. Patented May 3, 1892.
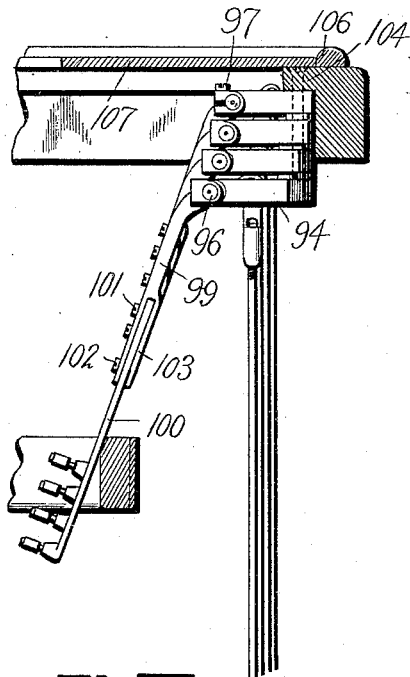
Fig. XIII.
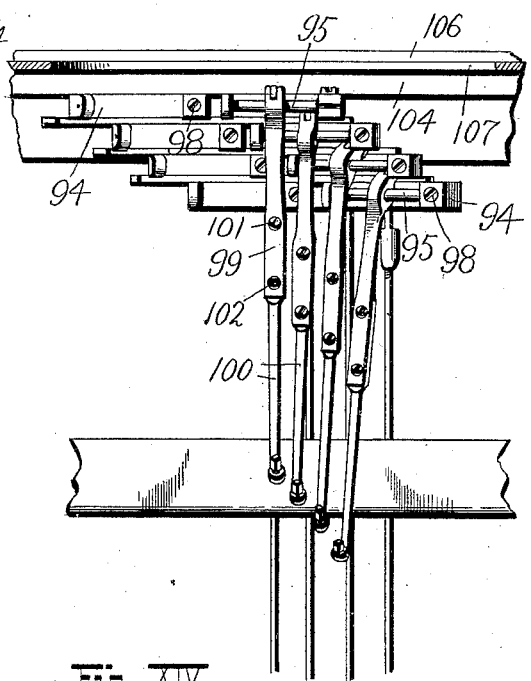
Fig. XIV.
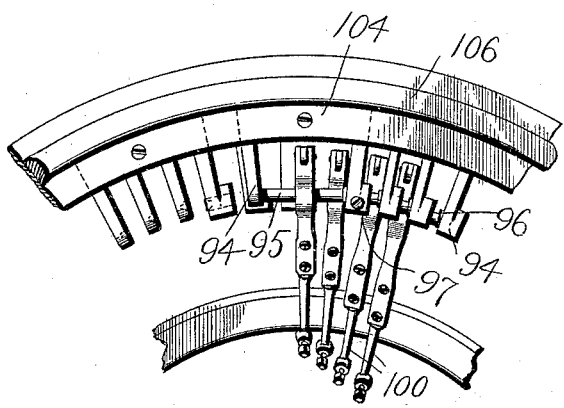
Fig. XVIII.
Witnesses:
Albert Speiden
M. C. Hillyard
Inventors:
Charles M. Clinton,
James McNamara,
by W. C. Stevens, Atty.

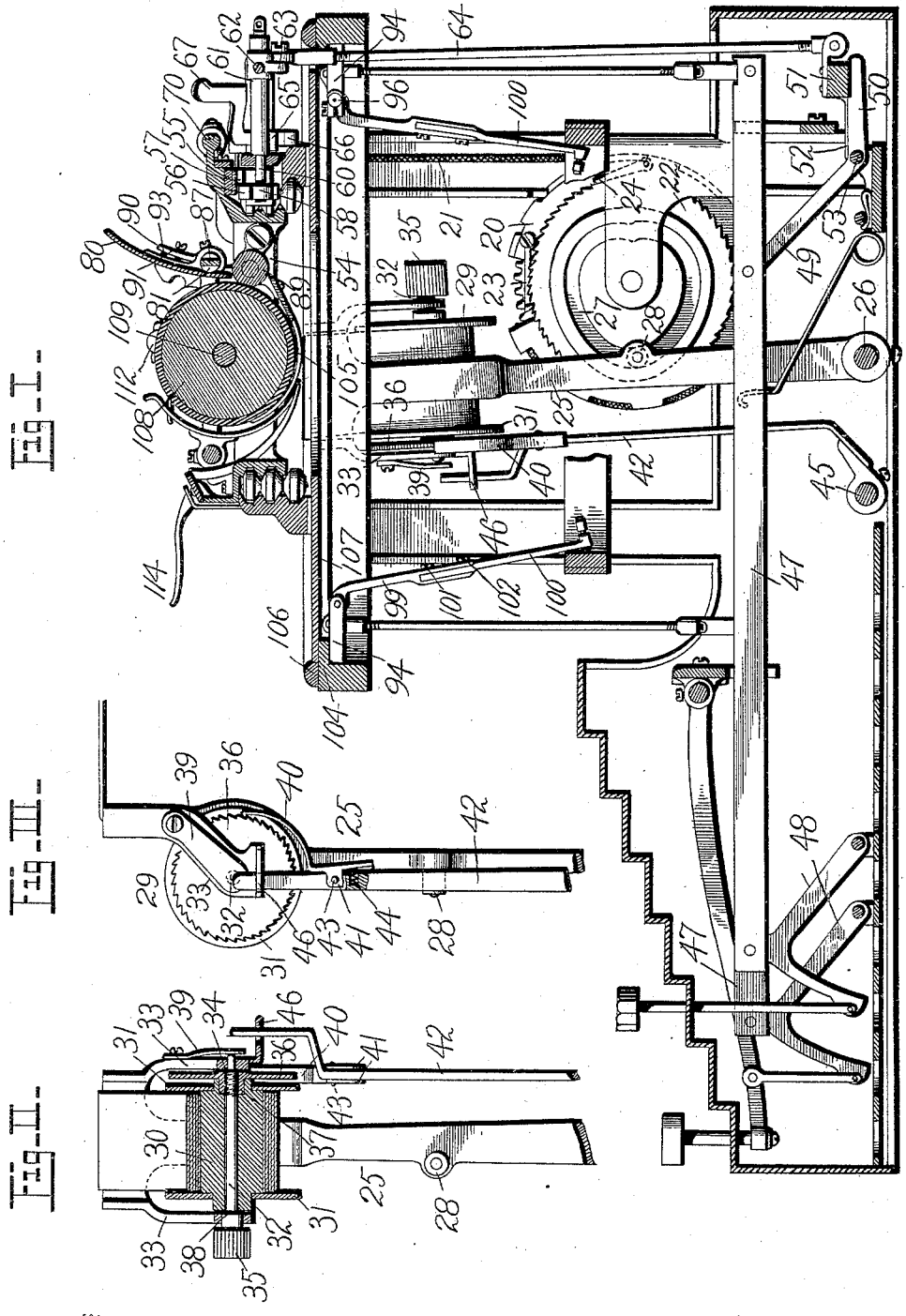

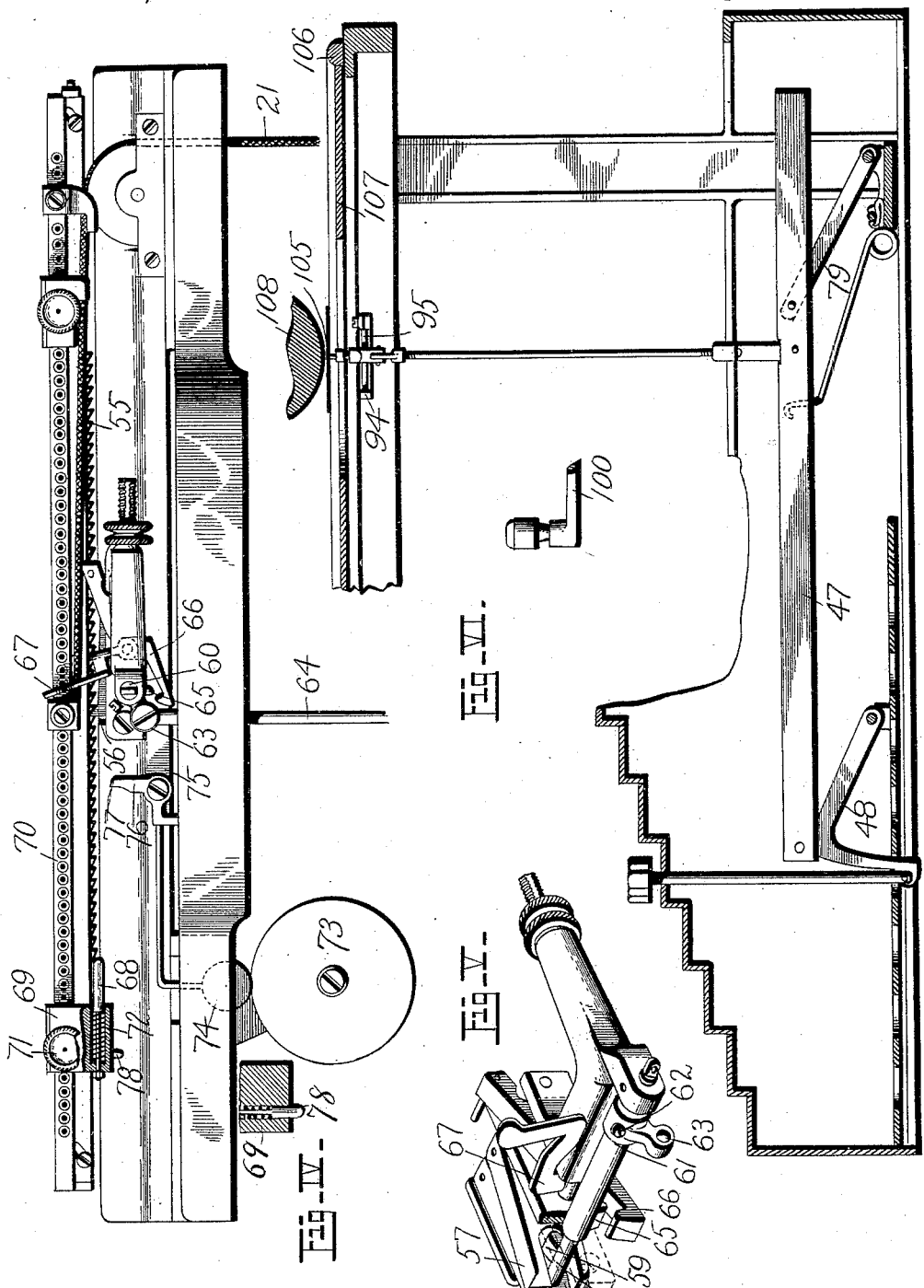

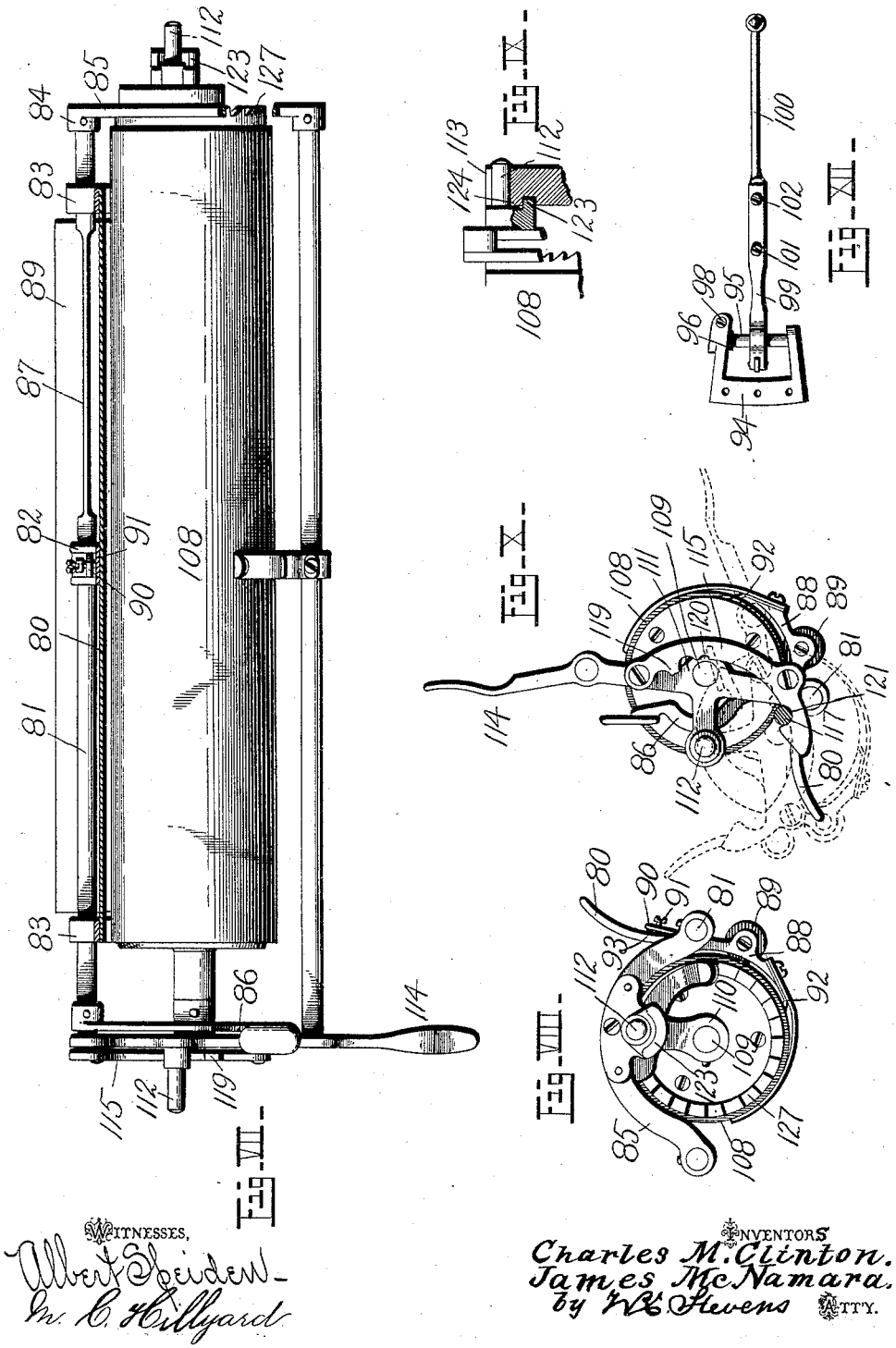

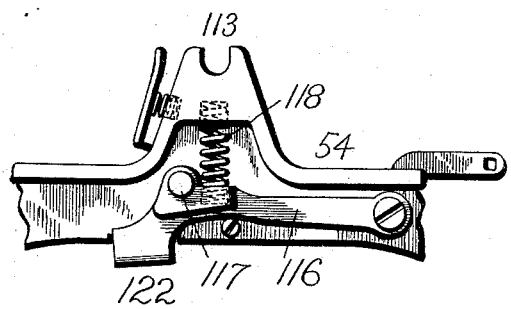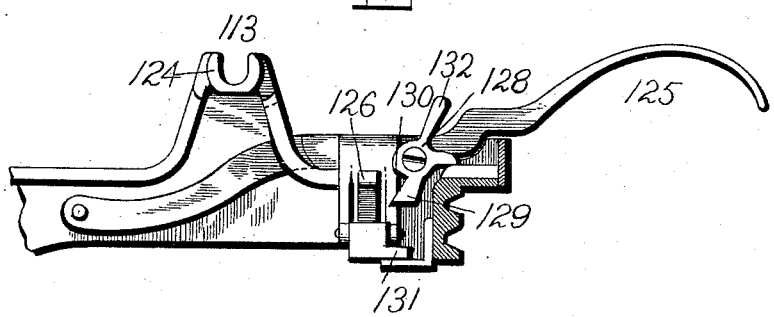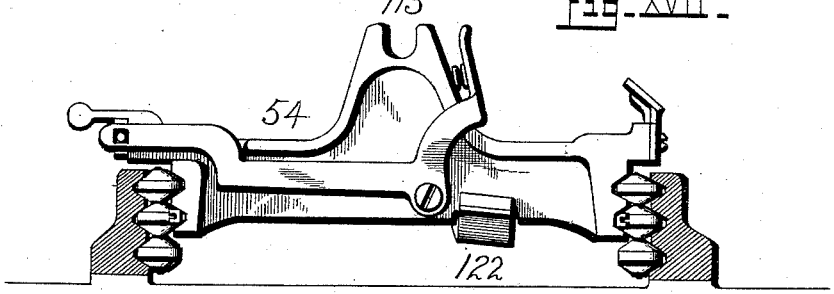

UNITED STATES PATENT OFFICE.

CHARLES M. CLINTON AND JAMES McNAMARA, OF ITHACA, NEW YORK.

TYPE-WRITING MACHINE.

SPECIFICATION forming part of Letters Patent No. 474,333, dated May 3, 1892.

Application filed November 21, 1891. Serial No. 412,596. (No model.)

*To all whom it may concern:*

Be it known that we, CHARLES M. CLINTON and JAMES MCNAMARA, citizens of the United States, residing at Ithaca, in the county of Tompkins and State of New York, have invented certain new and useful Improvements in Type-Writing Machines; and we do hereby declare the following to be a full, clear, and exact description of the invention, such as will enable others skilled in the art to which it appertains to make and use the same.

This invention relates to type-writing machines, and its object is to provide as follows: first, a simple feeding-hook whereby the ribbon ratchet-wheel will be positively fed with a pulling action; second, a direct-acting spacing device; third, means for locking the keys to prevent striking one letter upon another at the end of a line; fourth, means whereby a hyphen or one or more letters may be added to complete a word after the keys have been locked at the end of a line; fifth, means to enable the operator to draw a line mechanically of any required length with the long-dash key uninterrupted by the spacing mechanism; sixth, a simple bell-hammer tripper; seventh, means for regulating the tension of the apron and pressure-roller and for balancing the same alike upon both ends of the cylinder; eighth, brackets or hangers so arranged in groups that a shaft for each type-bar much longer than the circumferential space around the basket allowed to each type-bar may be conically journaled in said brackets; ninth, a type-bar made separable and adjustable midway to bring the type in line; tenth, means for holding the cylinder against upward pressure in open Y-bearings; eleventh, means for securing the cylinder in its normal position, also in position to view the work and in position to admit paper, and, twelfth, means for conveniently regulating the throw of the cylinder-revolver to one or two teeth at a time.

To this end our invention consists in the construction and combination of certain parts of a type-writing machine hereinafter described and claimed, reference being had to the accompanying drawings, in which—

Figure I is a transverse vertical section taken nearly at the center of a type-writing machine according to our invention, certain unimportant parts being left out to expose to view parts beyond. Fig. II is a longitudinal section of the ribbon-spool, showing the connection with the spool-carrier and feeding device. Fig. III is a front view of the spool-carrier and feeding device. Fig. IV is a rear side view of the feeding device, showing the connection with the key mechanism, also the key-locking device and the bell-hammer tripper. Fig. V is a perspective view of the escapement. Fig. VI is a detail view of the dash-key hangings in side elevation, with a rear side view of the type. Fig. VII is a top view of the impression-cylinder and its frame removed from the carriage, a portion of the apron being broken away to show its hangings. Fig. VIII is a right-hand end view of the cylinder and frame. Fig. IX is a detail in longitudinal section at the right-hand bearing of the cylinder-frame. Fig. X is a left-hand end view of the cylinder and frame in position to view the work, the dotted lines showing the normal position of the frame. Fig. XI is an inside view of the left-hand end of the carriage and its attachments. Fig. XII is a top view of a type-bar with its shaft and hanger. Fig. XIII is a vertical section of a portion of the basket, showing a series of type-bars and their hangers in side elevation. Fig. XIV is an inner side view of a series of type-bars and two groups of hangers with a portion of the basket-ring. Fig. XV is a detail view of a type-bar shaft, showing, also, its conical bearings in section. Fig. XVI is an inside view of the right-hand end of the carriage, showing the cylinder-revolver. Fig. XVII is a left-hand end view of the carriage, showing the rollways in vertical transverse section. Fig. XVIII is a top view of a portion of the ring-plate with two groups of hangers attached thereto.

20 represents a sprocket-wheel adapted to wind a cord or chain 21 to advance the carriage. Within this wheel is a common spring for rotating the wheel to draw the cord. When the operator pushes the carriage back, it winds up this spring, causing the necessary strain on the wheel to draw the carriage forward, as usual, step by step when the machine is operated.

22 is a ratchet-wheel mounted to revolve freely upon the shaft of the spring-wheel and connecting with the spring-wheel by means of a pawl 23, which pawl engages the teeth of the wheel 22 to advance it gradually as the spring-wheel advances.

24 is a detent pivoted to the frame of the machine to engage the ratchet-wheel and prevent its returning.

25 is a ribbon-spool carrier fixed upon a shaft 26, which is journaled in the frame, there being such a spool-carrier fixed upon the same shaft at the opposite end of the machine also, so that the ribbon may be wound to and fro from spool to spool.

27 is a cam-groove of heart shape in the face of the ratchet-wheel 22, in which groove a roller 28, journaled upon a stud projecting from the spool-carrier, is fitted to travel. This is a material advantage over a peripheral cam having the roller of the spool-carrier pressed thereon by a spring, because a positive motion is by the present means given to the ribbon both ways, and it requires less power because it does not have to overcome the resistance of a spring.

29 is a spool upon which the ribbon may be commercially provided to dealers and consumers. The hub 30 of this spool may be of wood, and the flanges 31 may be of tin or other sheet-metal secured thereon.

32 represents a spool-shaft having a bearing near each end to be journaled in arms 33 of the carrier 25, and it is further provided with a screw-thread in the region 34 and with a knurled knob or head 35, whereby the screw may be turned out or in by the thumb and finger of the operator, and 36 is a ratchet-wheel internally screw-threaded to receive the screw 34, and provided with a hub 37 to enter the counterbored end of the spool. By turning upon the knob 35 the operator secures the ratchet-wheel and spool rigidly upon the shaft, the spool being drawn firmly against the shoulder 38 by the pressure of the ratchet-wheel and the screw.

39 represents a tension-spring fixed to the carrier 25 at one end and bearing its other end directly against the end of the shaft 32 with sufficient pressure to prevent the weight of the ribbon midway between the spools from drawing itself slack from the rear spool, and yet not with sufficient resistance to retard the feeding action of the ratchet-wheel.

40 represents a hook-shaped pawl having side ears 41 projecting on both sides of the brace 42, whose rotary action upon the ratchet-wheel is the subject of a former patent. Through the said ears 41 of the pawl and the body of the brace extends a pivot-pin 43, upon which the pawl may swing a very little to slide over the teeth of the ratchet, and 44 is a light spring acting between the brace and pawl to force the latter into engagement with the ratchet-teeth. The brace being pivoted at 45, some distance from the carrier-shaft 26, and being caused to swing therewith by passing through a loop 46 on the carrier, it reaches upward its pawl as the carrier swings forward and engages a tooth of the ratchet-wheel, and as the carrier gradually swings backward the pawl causes the ratchet-wheel to gradually revolve and draw the ribbon forward with a positive and even motion and with very little friction.

47 represents the draw-bars mounted upon pivoted braces 48 and 49. The brace 49 is provided with a rearward projecting arm 50, and upon the whole series of these arms the spacer-bar 51 rests. This bar is provided with arms 52, which are hung upon the pivot-rod 53 of the rear braces 49, so that whether the bar be raised by a brace-arm at one point or another in its length it will be raised bodily alike at both ends.

54 represents the carriage fitted to slide in the frame in any usual manner and provided with a single fixed rack 55, to be engaged alternately by two detents 56 and 57, which are operated by two oppositely-projecting arms 58 and 59, respectively, upon a rock-shaft 60, which is journaled in the frame-work of the machine.

61 is a sleeve fitted upon the rock-shaft 60 and adapted to be secured thereto by means of a binding-screw 62.

63 is a crank-arm projecting from the sleeve, and 64 is a connecting-rod between the said arm and the spacer-bar 51. When any key is struck, the spacer-bar is raised and the detent 56 is thrown into engagement with the rack, holding the carriage rigidly still while the type strikes upon the paper; but on the instant that the key is released the detent 56 is withdrawn from the rack, and the detent 57, which is a little to the rear of the face of the tooth which was held by the detent 56, rises and stops the carriage by engaging the rack. This action is repeated at every stroke of the type or of the spacer-bar, and the binding-screw 62 enables the sleeve 61 to be turned upon the rock-shaft 60, so as to adjust the arms 58 and 59 to operate their respective detents at exactly the right time to perform the proper escapement.

65 is an arm projecting radially downward from the sleeve 61 to be engaged by a hook 66, which is pivoted to the frame and provided with a projecting arm 67 in the path of the spring-pin 68, which is fitted to play longitudinally in a block 69, which is fitted to slide upon a rod 70, and provided with a pointed set-screw 71 to engage any one of a series of holes in the side of said rod corresponding exactly in their spacing to the spaces of the feed-rack. The pin is constantly pushed forward by means of a spring 72, and it may project beyond the block a distance of one or more spaces. It is shown as projecting two spaces. The block 69 should be fixed upon the rod 70 at a point corresponding to the end of a line at the right-hand margin of the paper, and when, in the operation of writing with the machine, the end of a line is reached the spring-pin 68 has met the arm 67 of the hook 66 and raised the latter into engagement with the arm 65 of the sleeve 61, whereby the said sleeve is prevented from being rocked by the spacer-bar, the operator will find the next stroke of his finger upon any key resisted so that he cannot operate the key. He is therefore notified that the end of the line has been reached. Now if the word chances to be incomplete he may add a hyphen or another letter to the word by pressing the arm 67 backward against the action of the yielding spring-pin 68, thereby releasing the escapement and permitting the carriage to advance one space farther when the letter or hyphen is struck; but in this advance the spring-pin will again act upon the arm 67 and set the hook 66 into engagement to stop the operation of the keys, yet still one or more letters may be added by repeating the operation upon the arm 67 to free the hook 66 from the escapement. The length of the pin 68, projecting from the block 69, and the distance in spaces which the said spring may be sprung backward decides the number of letters which may be added after the marginal line has been reached. This will be recognized as a great convenience in rapid work where the mind of the operator is so absorbed in his text as not to notice the approaching end of the line.

73 represents a bell for sounding an alarm near the end of a line, and 74 is a hammer therefor, pivoted to the frame 75 and provided with an upward arm 76, having an incline 77 at its upper end, over which a trip-pin 78 will rise as the carriage moves backward. In the forward movement of the carriage this pin strikes the side of the arm 76 and swinging it forward raises the hammer until the pin passes over the arm, when the hammer will be released and permitted to strike upon the bell to signal the approaching end of a line. The trip-pin 78 is fitted to slide vertically in the box 69, and it may be left to fall by gravity to its normal position, or it may be aided by a spring. The relative positions of the arms 67 and 76 and their respective pins 78 and 72 are such that the bell will be sounded five spaces before the hook 66 is set to stop the machine at the end of a line. This locking of the keys prevents striking one letter upon another at the end of a line.

79 represents the rear brace of the long-dash key, and it differs from the other rear braces in having no rearwardly-projecting arm corresponding to the arms 50, so that when this dash-key is operated the spacer-bar is not worked thereby and the carriage stands still. This dash-type may be so located as to strike immediately under the last printed letter, and when so struck it does not change the position of the carriage, but permits the writing to go on as though the dash had not been used. Furthermore, this dash-type is rounded at each end like a sled-runner, so that the ribbon may pass freely over it without being scratched, and by pressing upon the dash-key and holding it down while the carriage is released and moved to and fro in the usual manner, independently of the spacing mechanism, a continuous line will be drawn upon the paper to underscore one or more words, or this line may be profitably used in place of a series of dots to fill out a line between the name of an article and its price in filling out bills, &c. The line thus made may be continuous from end to end or it may be broken at the will of the operator, wholly independent of the usual spacing mechanism, and it is thought in this respect to be an entirely new device in connection with a type-writer, the full scope and field of which may not yet be known. If the spacer-bar were operated by this dash-key the detent 56 would be held in engagement with the rack and the carriage could not be set free to be traversed to and fro by hand.

80 represents the apron, freely journaled upon a torsion-shaft 81 by means of a central bearing 82 and two end bearings 83. This shaft is secured rigidly at one end 84 in the cylinder-frame 85, and it is journaled at the other end to rotate a little in the same frame, and is provided with a finger-lever 86 at that end. The shaft 81 is flattened for nearly one-half of its length at 87 to form a spring upon which the lever 86 has a torsional action in turning the free end of the shaft in its bearing. In the lower arm 88 of the apron is journaled a soft-rubber roller 89.

90 represents a radial arm rigidly fixed upon the center of the torsion-shaft 81, and 91 is a screw threaded into the said arm and passing through the apron to pull the apron toward the arm, whereby the lower or acting portion of the apron 92 will be pressed upward toward the cylinder, and the same will be the action upon the presser-roller 89, so that the paper while being pressed between the roller and apron on the one side and the cylinder on the other side may be held up to the cylinder with any degree of closeness desired by means of the screw 91.

93 is a set-screw threaded the other way through the arm 90 and presses its end against the apron to check any looseness thereof after the same has been fixed by the screw 91. The torsional shaft 81 is a more effective means of holding the apron and roller in place accurately than if the same shaft were journaled freely at both ends and actuated to rotate by a separate spring and the machine is made more simple thereby. The apron being journaled upon the shaft by means of three bearings, one at each end and one in the center, and receiving its impulse only from the center, with both ends free to rock themselves into equal bearing upon the cylinder, the paper is evenly held thereby, and the trouble of adjusting two ends to bear exactly alike upon the paper is avoided.

94 represents a bracket in which the shaft 95 of the type-bar is journaled at both ends in conical bearings. The bearing at one end may be directly in an arm of the bracket; but at the other end the conical bearing is made in a step 96, which is fitted to slide in the bracket-arm longitudinally to the shaft, in order that the bearing may be adjusted to the desired degree of closeness in regular service and that it may be set up to the shaft to compensate for wear. When set in the desired position, it may be fixed by any usual means, such as a binding-screw 97, threaded through the bracket-arm to bear against the side of the step, or by means of a binding-screw 98 passing through the split end of the bracket-arm and threaded into one portion thereof to hug the two portions together upon the step.

99 represents a portion of the type-bar, rigidly fixed to the shaft 95 about midway thereof, and 100 is another portion of the type-bar, secured to the first-named portion of the said bar by means of two binding-screws 101 and 102. These screws may be threaded through one portion of the bar and fitted a little freely through the other portion, so that when the screws are loosened the type end 100 of the bar may be slipped a little either lengthwise or sidewise to align the type, and when properly aligned it may be so fixed by means of the binding-screws. The two portions of the bar may be joined by slotting one portion and fitting a tenon of the other portion closely into it, as shown, or they may be halved together with the lower portion 103 left off. The type-bar shaft 95 is very much longer than the circumferential space alotted to each type-arm, so that the required number of type could not be inserted, each having an arm of this length, if the brackets were located side by side in the same horizontal plane, and if the shaft be made short the type hung thereon will soon get out of alignment. We have therefore made these brackets in groups, one below another, and located to one side thereof a distance corresponding to the circumferential space alotted to each arm. We prefer to make the brackets in groups of four in each group, one located below the other, and all four of the brackets of each group may be secured to the table-ring 104 by means of screws, or the brackets may be riveted together, two, three, or four in a bunch, and the bunch be fastened by one or more screws. The bearing-arms in these brackets are nearly radial, and the shaft 95 is practically at right angles to the type-bar which it supports. The cone-bearings at its ends lie in the same circle. Each shaft therefore lies in the position of the chord of a circle. By placing the brackets in groups of four each, one above the other, and the center of each one in the radial line of its type-bar from the common striking-point 105 of all the type, we are enabled to make the shaft of a length nearly equal to four circumferential spaces of type-bars. In order that the type-bars may be all of one pattern and of equal length, each succeeding lower bracket has to be placed a little nearer a vertical central line than the one above it, so that the distance from the striking-point to the bearings of the shaft in each bracket in the planes below will be the same.

106 represents an annular ridge projecting above the table to support the ribbon from contact with the table, and 107 represents a ring-plate serving as a cover for all the type-hangers, also as a bearing for the rotary brush covered in our former patent, No. 449,616.

108 represents the cylinder mounted to revolve freely upon a shaft 109, which is rigidly fixed to the two end portions 110 and 111 of the frame 85. These end portions are provided with trunnions 112, located directly above the cylinder-shaft and hung in open Y-bearings 113 of the carriage 54.

114 is a projecting arm or handle of the cylinder-frame, whereby the frame and cylinder therein may be rocked upward and forward to the position shown in Fig. X for the purpose of inspecting the work.

115 represents a circular segment whose inner edge is an arc concentric with the adjacent trunnion 112.

116 is a spring-catch having a projecting stud 117 to engage the said inner edge of the segment 115 and to bear downward thereon, actuated by a spring 118.

119 represents a shoulder at the forward end of the segment to strike against the stud 117 to stop the cylinder from going too far back, and the segment is slightly notched at this point to be engaged by the stud to hold the cylinder in position for service.

120 represents a little notch in the segment to be engaged by the stud to hold the cylinder a little raised, in a proper position for inserting paper, and 121 represents a shoulder and notch at the rear end of the segment to be engaged by the stud to hold the cylinder raised for inspection, as in Fig. X.

122 represents a thumb-piece projecting from the catch 116, whereby the same may be raised upward to entirely disengage the segment and permit the cylinder and frame to be raised directly upward out of the bearings 113, thus removing the cylinder and frame for any desired purpose, such as cleaning the type or replacing the cylinder with another. The rear end of the segment 115 is nose-shaped, so that in returning the cylinder and frame there is nothing to do but to drop the trunnions into their bearings and swing the cylinder-frame directly downward and backward, when the said nose will wedge the stud 117 upward into engagement with the inner edge of the segment.

In order to retain the right-hand end of the cylinder in its bearing against the upward stroke of the type in service, or against falling out in transportation, a segmental flange 123 is formed on the cylinder-frame 85 to register with a correspondingly-formed flange 124, projecting inward from the trunnion-bearing 113 of the carriage. When the cylinder is swung forward and upward, the segment 123 is thereby turned out of engagement with the flange 124 to permit the cylinder-frame to be removed. The left-hand end of the cylinder is similarly held down by the stud 117, projecting over the segment 115.

125 represents the revolver-lever provided with a pawl 126, adapted to engage a crown-wheel of teeth 127 on the cylinder.

128 represents an adjustable stop having two shoulders 129 and 130 to engage a projecting leaf 131 upon the pawl, whereby the motion of the pawl will be limited. If the stop be turned so that the shoulder 129 is in the path of the leaf 131 the revolver can only be raised enough to move the crown-wheel one tooth, corresponding to one line of space on the paper; but if the stop be tipped to bring the shoulder 130 into the path of the leaf 131 the revolver-lever may be raised enough to rotate the cylinder the space of two teeth or two lines.

132 is a handle of the stop 128, projecting upward in a position convenient to be readily operated.

The operation and some of the advantages of the various parts of our invention having been set forth in the foregoing description, a repetition thereof is deemed unnecessary.

In relation to the locking device for the spacing mechanism, it is evident that the spring-pin 68 or any similar yielding tripper might as well be attached to the other coacting member 67. The relative positions of the hammer trip-pin 78 and the key-locking pin 68 upon the block 69 to their coacting arms 76 and 67, is such that both pins are properly located by merely adjusting the block upon the carriage, and this is done at one operation. It is evident that the block 69 would operate the hook-arm 67 merely to lock the escapement without the aid of the pin 68, the real service of the trip-pin being its yielding to permit unlocking the escapement.

Having thus fully described our invention, what we believe to be new, and desire to secure by Letters Patent, is the following:

1. The combination, in type-writing machines, of a sliding carriage, a ribbon-carrier mounted for transverse movement, a spring-wheel journaled upon the frame and connected with the carriage by a cord or chain, a ratchet-wheel journaled to the frame concentrically with the spring-wheel, a spring-pawl upon the spring-wheel to engage the said ratchet, and a detent hung upon the frame to engage the same ratchet, a cam-shaped groove in the face of the ratchet-wheel, and a stud or roller upon the ribbon-carrier to engage the said groove, substantially as described, whereby a positive reciprocating motion will be given to the ribbon-carrier.

2. The combination, in type-writing machines, of a carriage-feed wheel and a grooved cam-wheel connected to be revolved together, a ribbon-carrier mounted for transverse movement and having a stud or roller engaging the said cam-groove, substantially as described.

3. The combination, in type-writing machines, of a spool-carrier having two journal-bearings, a shaft having a journal at one end, a screw-thread near it, a body to receive a spool next to the screw, a shoulder at the end of the body to hold the spool, a journal and a head beyond the shoulder, the said journals fitted to the said bearings, and a ratchet feed-wheel screw-threaded through its hub to receive the said screw-shaft, substantially as described.

4. The combination, in type-writing machines, of a spool-shaft shouldered near one end, screw-threaded near the other end, and provided with journals beyond the shoulder and screw, a ratchet-wheel screw-threaded to receive the said shaft-screw, and a spool-carrier having journal-bearings for the said shaft, substantially as described, whereby a commercial ribbon-spool, a ratchet-wheel, and the shaft therefor may be bound to revolve as one.

5. The combination, in type-writing machines, of a spool-carrier pivoted at one end to the frame, a ratchet-wheel and spool journaled in the carrier, a brace pivoted to the frame at a distance from the carrier-pivot and freely connected to swing with the carrier, and a hook-shaped pawl having ears at one end straddling the said brace and pivoted thereto, and a spring between the brace and pawl, substantially as described.

6. The combination, in type-writing machines, of draw-bars for the type-keys, each draw-bar mounted for a parallel motion on pivoted braces, the rear braces being provided with rearwardly-projecting arms, a spacer-bar having arms pivoted to the frame and resting freely upon the said rear arms, and connections between it and the escapement, substantially as described.

7. The combination, in type-writing machines, of a carriage mounted to slide upon a frame and provided with a feed-rack, two detents pivoted to the frame to engage the rack alternately, a rock-shaft provided with two arms to engage the said detents, respectively, a crank upon the rock-shaft, and a binding-screw adjustably securing the same, a spacer-bar, and a rod connecting it with the said crank, substantially as described.

8. The combination, in type-writing machines, of two feed-rack detents, a rock-shaft provided with arms to engage the detents, a crank upon the rock-shaft, and connections between the crank and spacing-key, the said crank being adjustable around the rock-shaft, substantially as described, whereby the action of the rock-shaft arms upon the detents may be accurately adjusted to control the escapement.

9. The combination, in type-writing machines, of a block upon the carriage having a spring-pin projecting forward in the line of travel, and a locking device for the spacing mechanism having its actuating-arm in the path of the said pin, substantially as described, whereby the advancing carriage first automatically locks the spacing mechanism at the end of a line and then the operator may unlock the same to permit a hyphen or one or more letters to be added.

10. The combination, in type-writing machines, of a carriage, a block longitudinally adjustable thereon, a spacing-mechanism-locking device having its actuating-arm in the path of the said block, and a yielding tripper to communicate motion from the said block to the said actuating-arm, substantially as described.

11. The combination, in type-writing machines, of a block upon the carriage in the path thereof, the actuating-arm of an automatic spacer-locking device, and a yielding tripper between the said block and arm, substantially as described.

12. The combination, in type-writing machines, of a dash-type, means for operating it independently of the spacing mechanism, and means for releasing the carriage to permit it to be drawn freely to and fro, substantially as described, whereby the dash-type is caused to draw a line.

13. The combination, in type-writing machines, of a dash-type rounded at the end in sled-runner fashion, means for holding the type against the paper or ribbon, and means for releasing the paper-carriage to be freely slid along, substantially as described.

14. The combination, in type-writing machines, of a bell, a block adjustably secured upon the carriage, and a pin projecting from the block and fitted to slide into it, a spring impelling the pin outward, and a hammer for the bell pivoted to the frame and having an arm projecting into the path of the pin to be pushed by the pin as the latter advances, the said arm being nose-shaped at its end to wedge the pin out of its path in retreating, substantially as described.

15. The combination, in type-writing machines, of a block adjustably fixed upon the carriage, a pin fitted to slide endwise into the block transversely to the line of travel, and a bell-hammer having an arm in the path of the said pin and nose-shaped at its end, substantially as described.

16. The combination, in type-writing machines, of a block adjustably secured upon the carriage, a pin fitted to the block with a yielding movement in line of the carriage, an escapement-operating rock-shaft provided with a radial arm and a hook pivoted to the frame to engage the said radial arm and having an arm extending into the path of the said block-pin, substantially as described.

17. The combination, in type-writing machines, of a trip-pin attached to the carriage with a yielding movement in the direction of the carriage, and an escapement-locking device provided with an actuating-arm in the path of the said yielding trip-pin, substantially as described.

18. The combination, in type-writing machines, of an impression-cylinder journaled in a frame, an apron freely journaled upon a shaft, the latter being fixed at one end and journaled at the other end in the said frame and further being thinned for a portion of its length to serve as a torsional spring, a finger-lever secured to the free end thereof, and connections between the apron and shaft, substantially as described.

19. The combination, in type writing machines, of a cylinder-frame, a torsional spring-shaft secured at one end and journaled at the other end in said frame, and an apron mounted upon said shaft, substantially as described.

20. The combination, in type-writing machines, of a cylinder-frame, a shaft journaled therein and having a centrally-fixed radial arm and a finger-lever near one end, an apron having two end bearings and a central bearing, all journaled upon the said shaft, and a binding-screw and a set-screw connecting the apron with the said radial arm of the shaft, substantially as described.

21. The combination, in type-writing machines, of a series of separate brackets secured one upon another and all dependent from the ring-table or top ring, substantially as described.

22. The combination, in a type-writing machine, of a series of separate brackets secured one upon another, each to one side of another upon a different radius, and all dependent from the ring-table or top ring, substantially as described.

23. The combination, in type-writing machines, of two portions of a type-bar fitted together midway the length of the bar and secured by screws fitting loosely in holes in one of the portions, substantially as described, whereby the type may be adjusted as to alignment in any direction.

24. The combination, in type-writing machines, of a cylinder mounted to revolve upon a shaft in a frame which has trunnions projecting from its ends directly over the line of the shaft and is provided with a circular segment concentric with one of its trunnions, a carriage having open Y-bearings to receive the said trunnions, and a spring-catch having a stud to engage the inner edge of the said segment, substantially as described.

25. The combination, in type-writing machines, of a cylinder-frame having trunnions and a circular segment notched on its inner edge, a carriage having open Y-bearings for the said trunnions, and a spring-catch having a stud to engage the said segment and the notches therein, substantially as described.

26. The combination, in type-writing machines, of a cylinder-frame having trunnions and a circular segment notched on its inner edge and nose-shaped at one end, a carriage having open Y-bearings for the said trunnions, and a spring-catch upon the carriage having a stud to be raised by the said nose and to engage the said segment and notches, substantially as described.

27. The combination, in type-writing machines, of a cylinder-frame having projecting trunnions, a carriage having open Y-bearings to receive the said trunnions, the shoulder upon the trunnion-shaft, and the adjacent side of the bearing, each being provided with a segmental flange to register with the other, substantially as described, whereby the trunnions will be held in the open bearing when the cylinder is down at work, and will be released when the cylinder is swung upward.

28. The combination, in type-writing machines, of a line-spacing pawl pivoted upon a revolver-lever and having a side-projecting leaf and a stop pivoted to the carriage and having two shoulders, either of which may be set in the path of the said leaf to limit the motion thereof to one or two line-spaces, substantially as described.

29. The combination, in type-writing machines, of a block longitudinally adjustable to letter-spaces on the carriage and provided with two trippers, a bell-hammer-actuating arm hung in the path of one of the said trippers, and the actuating-arm of a spacer-locking device hung in the path of the other tripper, substantially as described, whereby a single adjustment arranges to operate both the bell and the locking device at the end of a line.

In testimony whereof we affix our signatures in presence of two witnesses.

CHARLES M. CLINTON.
JAMES McNAMARA.

Witnesses:
WM. HAZLITT SMITH,
ALBERT NIEDECK.